United States Patent [19]
Teich

[11] Patent Number: 6,035,366
[45] Date of Patent: Mar. 7, 2000

[54] COMPUTER ARCHITECTURE USING PACKET SWITCHES FOR INTERNAL DATA TRANSFER

[75] Inventor: Paul R. Teich, Austin, Tex.

[73] Assignee: Advanced Micro Devices Inc, Sunnyvale, Calif.

[21] Appl. No.: 08/915,631

[22] Filed: Aug. 21, 1997

Related U.S. Application Data

[60] Provisional application No. 60/039,425, Mar. 7, 1997.

[51] Int. Cl.[7] .............................. H04B 7/216; G06F 13/00
[52] U.S. Cl. ......................... 710/131; 370/351; 370/352; 370/356; 370/360
[58] Field of Search ........................... 710/131; 370/351, 370/352, 356, 360, 412, 413, 415

[56] References Cited

U.S. PATENT DOCUMENTS

| | | | |
|---|---|---|---|
| 4,631,534 | 12/1986 | Franklin et al. | 370/85 |
| 4,677,616 | 6/1987 | Franklin | 370/94 |
| 4,962,497 | 10/1990 | Ferenc et al. | 370/60.1 |
| 5,854,786 | 12/1998 | Henderson et al. | 370/335 |

OTHER PUBLICATIONS

"DiskSwitch Architecture", obtained from www.3ware.com/architecture.htm Internet site on May 4, 1999.

*Primary Examiner*—Ayaz R. Sheikh
*Assistant Examiner*—Rupal D. Dharia
*Attorney, Agent, or Firm*—Foley & Lardner

[57] ABSTRACT

A computer architecture includes a plurality of computer components, a packet switch bank and a plurality of packet interfaces each connecting a corresponding one of the computer components to the packet switch bank, wherein the computer components communicate via the packet switch bank through the plurality of packet interfaces. The packet switch bank can include a plurality of packet switches and a packet switch controller connected to each of the plurality of packet switches. The packet switch controller can thus control each packet switch to be coupled to specific computer components. The packet switch bank can further include a plurality of queues between the packet switches and the computer components. Also provided is a method of communicating from a first component of a computer system to a second component of the computer system, including the steps of transmitting a packet from the first component to a packet switch bank, selecting a packet switch from a plurality of packet switches in the packet switch bank to handle the packet, configuring the selected packet switch to be coupled at an input side to the first component, configuring the selected packet switch to be coupled at an output side to the second component, and transferring the packet through the selected packet switch to the second component.

7 Claims, 7 Drawing Sheets

COMPUTER ARCHITECTURE USING PACKET SWITCHES FOR INTERNAL DATA TRANSFER

RELATED APPLICATIONS

This application claims priority to provisional application 60/039,425, filed Mar. 7, 1997.

BACKGROUND OF THE INVENTION

In a conventional computer architecture, various computer components communicate via a bus. For example, a central processing unit (CPU), a hard disk, a system memory and a floppy disk can each be connected to a system bus and can communicate with each other and with other devices connected to the system bus via the system bus. This conventional architecture has many drawbacks.

For example, if two or more devices attempt to output data to the system bus at the same time, bus contention results, thereby forcing all but one of the devices to wait a predetermined period of time and then make another attempt to transfer data over the system bus. If many devices are involved, this bus contention can bog down the system, greatly reducing its efficiency.

Another drawback of the conventional architecture is that a system bus has a specifically limited bandwidth. The only ways to increase the communication bandwidth are to increase the width (number of bits transmitted in parallel) of the system bus or to increase the bus clock associated with the system bus.

However, increasing the bus clock has an additional detrimental effect in that in order for the system to operate, each of the devices connected to the bus must have the capability to access the bus at the bus speed. Thus, when bandwidth is increased by increasing the bus clock, each of the devices connected to the bus may need to be upgraded. This requirement exists regardless of the native speed of each device, such that a device which can meet all its other operational requirements by operating at a relatively slow speed must be made unnecessarily complicated or expensive in order to communicate via a bus which operates at a relatively high speed.

Further, bus contention schemes which allocate bus bandwidth to one of a plurality of competing devices impose a significant amount of overhead on a system in order to perform collision detection. Also, by causing the devices to repetitively attempt to transmit data via the bus, the amount of bandwidth which is available for data transfer is significantly reduced.

SUMMARY OF THE INVENTION

It is an object of the invention to overcome these drawbacks of a conventional computer architecture. For example, it is an object of the invention to provide an architecture which is scalable such that the bandwidth available for inter-device communication can be increased easily.

It is also an object of the invention to provide an inter-device communication architecture for a computer wherein each of the devices can communicate at its native speed without the need for incorporating circuitry into each device which would require each device to communicate at a higher bus speed which may be, for example, the highest native speed amongst the devices.

It is another object of the invention to provide a computer inter-device communication architecture which accommodates multiple devices simultaneously transmitting data without resulting in a collision and the accompanying overhead and system slowdown.

In a first embodiment according to the invention, a computer architecture according to the invention includes a plurality of computer components, a package switch bank and a plurality of packet interfaces. Each packet interface connects a corresponding one of the computer components to the packet switch bank. The computer components thus communicate via the packet switch bank through the plurality of packet interfaces.

In the first embodiment according to the invention the packet switch bank can include a plurality of packet switches and a packet switch controller which is connected to each of the packet switches. The packet switch controller can thus control each packet switch to couple each packet switch to specific ones of the computer components. For example, the packet switch controller can control each packet switch to be coupled to two of the computer components.

The packet switch bank can further include a plurality of queues which are positioned between the packet switches and the computer components. Each queue can be affiliated, for example, with a corresponding packet switch, such that the packet switch controller allocates queues affiliated with a given packet switch to interfaces between the given packet switch and specific ones of the computer components which are coupled with the given packet switch. Alternatively, each queue can be affiliated with a corresponding computer component, such that the packet switch controller allocates queues affiliated with a given computer component to interfaces between the given computer component and a specific packet which is coupled to the given computer component.

Operationally, each computer component which is part of the computer architecture corresponding to the first embodiment according to the invention can send messages to and receive messages from the packet switch bank at a specific rate. Thus, each computer component can send and receive massages at a rate which is different from the rates of any of the other computer components. Therefore, there is no requirement for each of the computer components to communicate with the other computer components at a common speed.

In a second embodiment according to the invention, a method of communicating from a first component of a computer system to a second component of the computer system includes the steps of transmitting a packet from a computer component to a packet switch bank, selecting a packet switch from a plurality of packet switches in the packet switch bank to handle the packet, configuring the selected packet switch to be coupled at an input side to the first component and at an output side to the second component, and transferring the packet through the selected packet switch to the second component.

When the selected packet switch is configured, it can be configured to be simultaneously coupled to the first component and the second component, or, alternatively, can be configured to be independently coupled to the first component and the second component.

The method corresponding to the second embodiment according to the invention can further include the step of queuing the packet at the input side of the packet switch. Alternatively, it can include the step of queuing the packet at the output side of the packet switch. The packet can be transmitted from the first component to the packet switch bank at a first data rate and transferred from the selected packet switch to the second component at a second data rate.

The first data rate can be, for example, associated with the first component, and a second data rate can be, for example, associated with a second component.

BRIEF DESCRIPTION OF THE DRAWINGS

These and other objects and advantages of the invention will be apparent from a review of the specification in light of the drawings, wherein.

DETAILED DESCRIPTION

Figure 1:
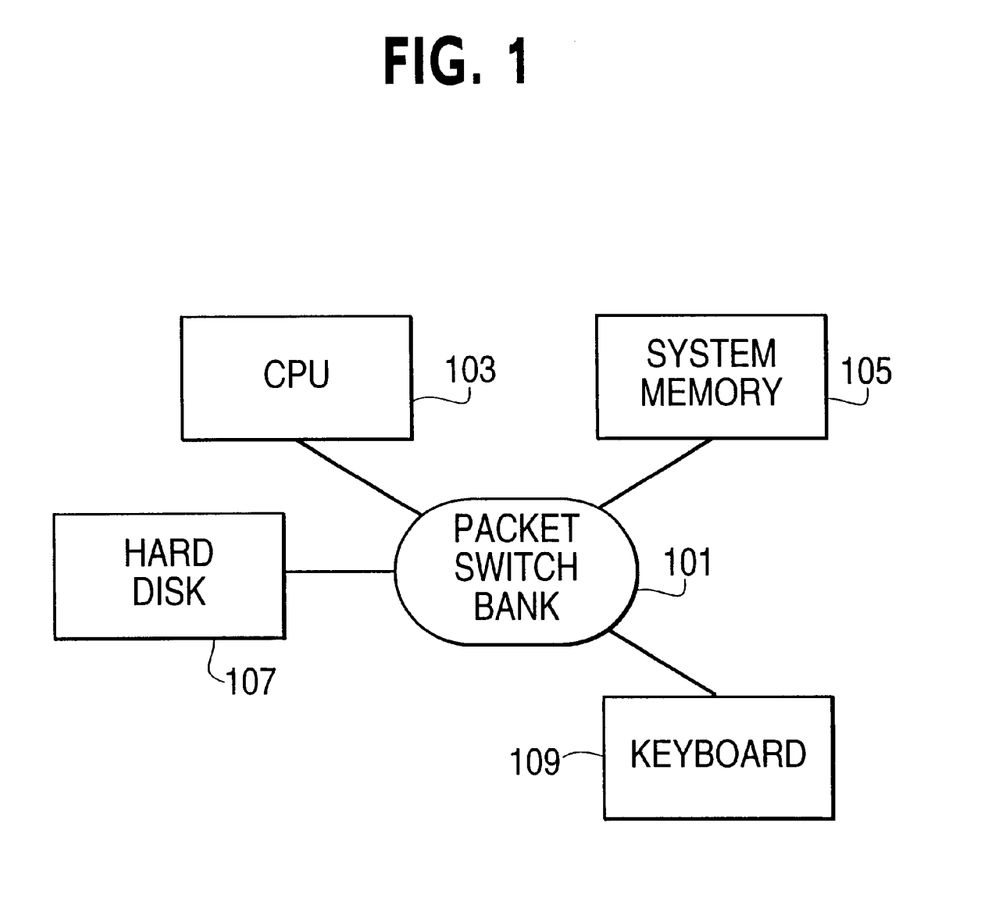
FIG. 1 shows a block diagram of a first embodiment according to the invention.

FIG. 1 shows a block diagram of a first embodiment according to the invention. Packet switch bank 101 interconnects computer components such as central processing unit (CPU) 103, system memory 105, hard disk 107 and keyboard 109.

The components shown in FIG. 1 are merely by way of example. Additional computer components can also be connected to packet switch bank 101. For example, a CD-ROM can be connected to packet switch bank 101. A network interface for connection of the computer system to a network can also be connected to packet switch bank 101. Also, CPU 103 can be connected to packet switch bank 101 via an L2 cache. In addition to keyboard 109, other user input devices can be connected either directly or indirectly to packet switch bank 101. For example, keyboard 109 can be connected to packet switch bank 101 via a common interface which is shared by a mouse and a scanner.

According to the example shown in FIG. 1, CPU 103 communicates with system memory 105, hard disk 107 and keyboard 109 via packet switch bank 101. Thus, packet switch bank 101 performs a function which would traditionally be performed by one or more buses internal to a computer architecture.

Figure 2:
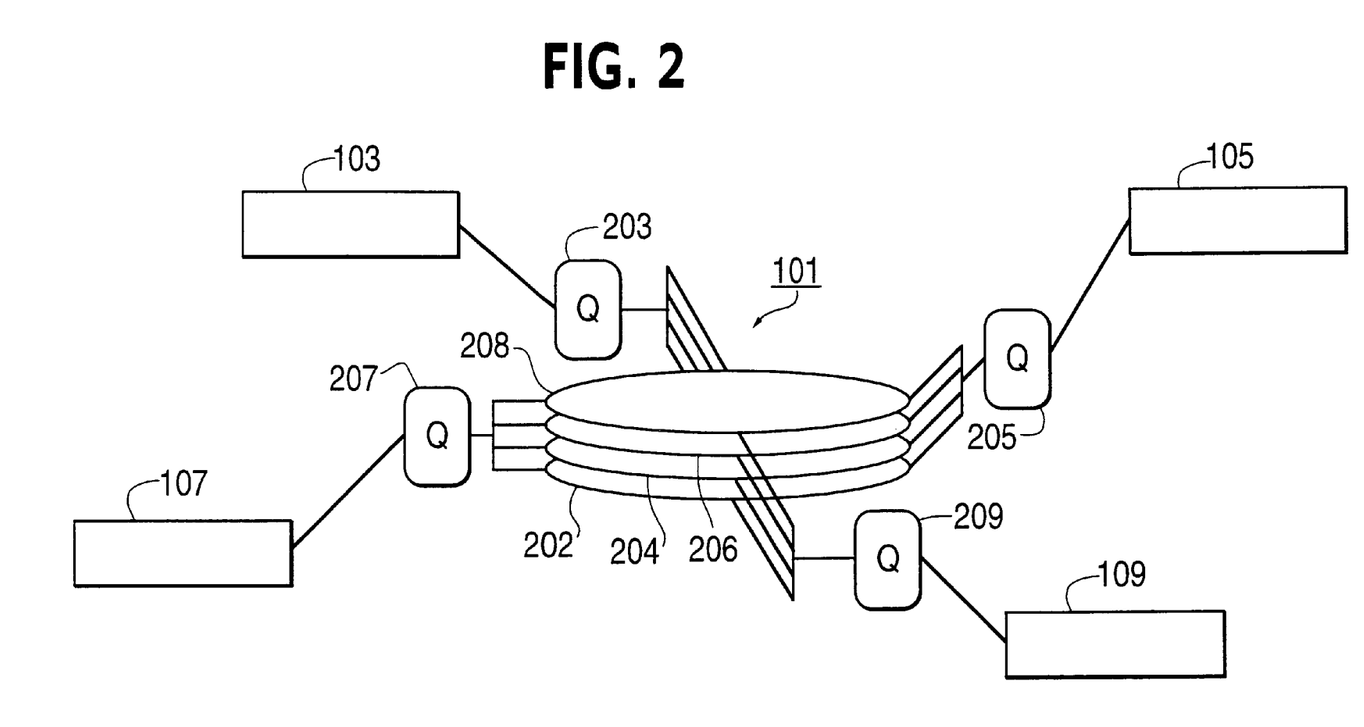
FIG. 2 shows the architecture of FIG. 1 in greater detail.

FIG. 2 shows the architecture of FIG. 1 in greater detail wherein packet switch bank 101 includes four packet switches 202, 204, 206 and 208. Each of the packet switches 202–208 is connected to CPU 103, system memory 105, hard disk 107 and keyboard 109 via queues 203, 205, 207, and 209, respectively. If additional computer components are integrated into the computer architecture, each of these additional computer components would also be connected to each of the packet switches 202–208 via a queue.

As shown in FIG. 2, queues 203–209 perform a many-to-one operation. Queues 203–209 may be part of their respective components 103–109 or, alternatively, queues 203–209 may be integrated with packet switch bank 101.

As can be seen in FIG. 2, packet switch bank 101 includes a plurality of packet switches and is scalable such that an increase in bandwidth can be achieved by adding an additional packet switch to packet switch bank 101 and interconnecting the added packet switch to each of the devices 103–109.

Figure 3:
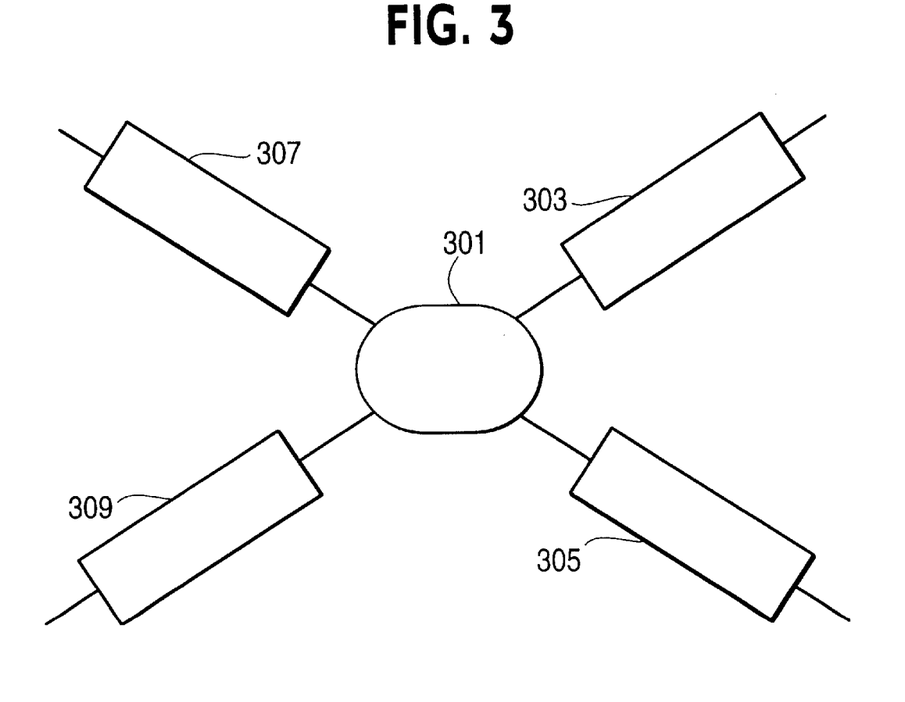
FIG. 3 shows an example of a packet switch within the packet switch bank of FIGS. 1 and 2.

FIG. 3 shows an example of one configuration of each of the packet switches 202–208 within package switch bank 101. In this configuration, each packet switch includes switcher 301 and a plurality queues. Each queue is provided at an input/output of the packet switch for interconnection with a device connected to the input/output port.

For example, queue 303 is on the input/output port connected to system memory 105, queue 305 is on the input/output port connected to keyboard 109, queue 307 is on the input/output port connected to CPU 103 and queue 309 is on the input/output port connected to hard disk 107. According to this example, switcher 301 can receive information from any one of the queues 303–309 and pass this information to any of the other queues within the set of queues 303–309.

One benefit of the arrangement of FIG. 3 is that each of the computer elements shown in FIG. 1 can communicate with a specific packet switch such as that shown in FIG. 3 at a native rate associated with the computer component. For example, if keyboard 109 is providing information to CPU 103 through the packet switch shown in FIG. 3, a connection such as that shown in FIG. 4 would be made between queue 305 associated with keyboard 109 and queue 307 associated with CPU 103. This connection can be made, for example, when queue 305 is full, thereby indicating that a complete packet or set of packets is ready for transfer to CPU 103.

Figure 4:
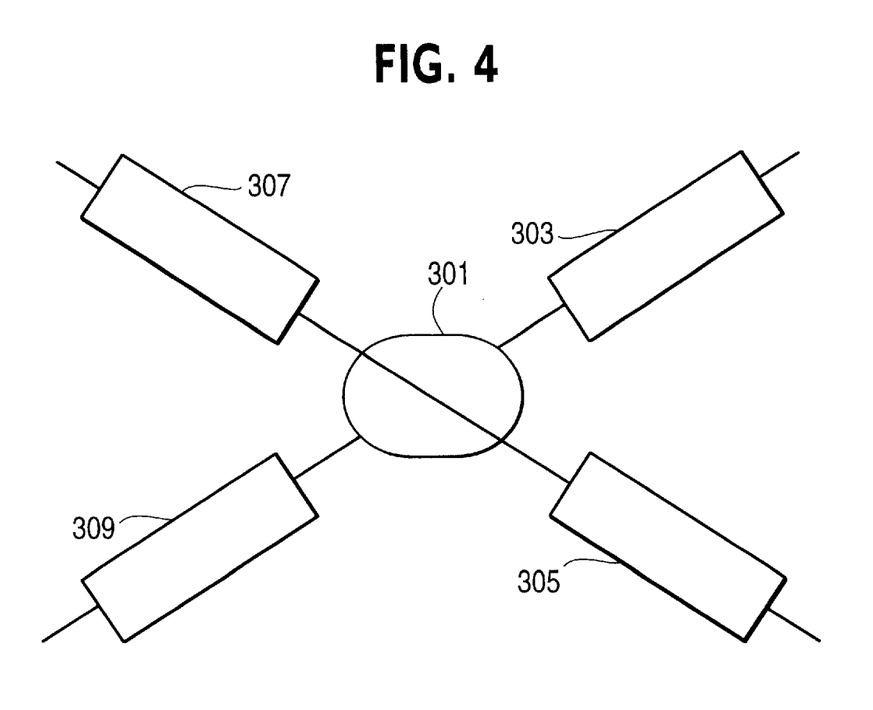
FIG. 4 shows a specific connection within the packet switch of FIG. 3.

For example, presume hard disk 107 outputs data at a rate of 20 megabits per second. If hard disk 107 has 5 kilobits of information to transfer to CPU 103, this information may comprise, for example, five one kilobit packets. Thus, as hard disk 107 transfers this information to queue 309 at a 20 megabit per second rate, each time queue 309 has a full packet's worth of information stored therein, a connection can be made by switcher 301 so that this packet is transferred to queue 307. The information in queue 307 can then be read by CPU 103 at a native rate corresponding to CPU 103, such as, for example, one gigabit per second. Thus, during the periods of time for which the connection shown in FIG. 4 is not made, i.e. during the periods of time when queue 305 is being filled by keyboard 109, different connections can be made by switcher 301.

Figure 5:
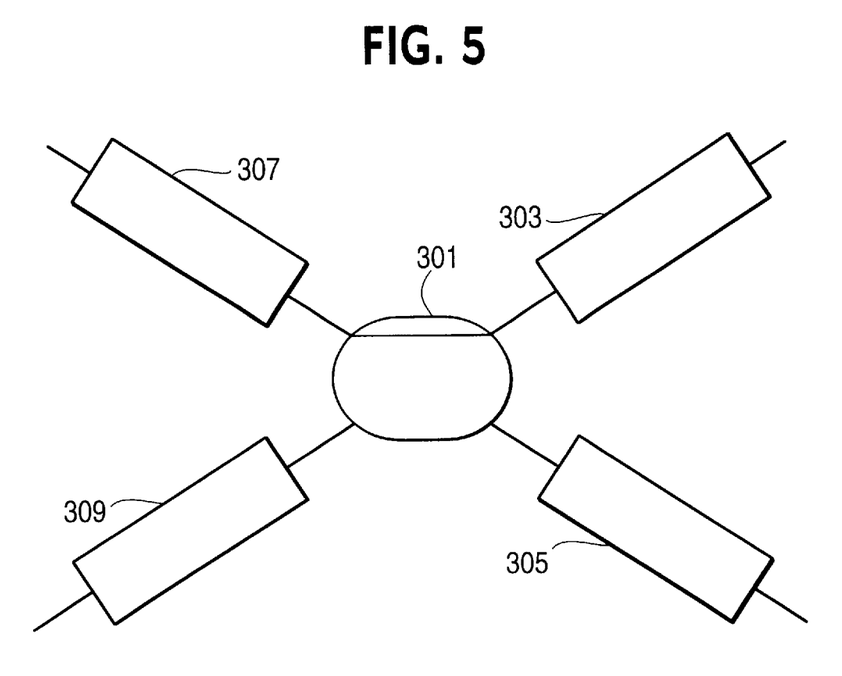
FIG. 5 shows another connection within the packet switch of FIG. 3.

For example, while keyboard 109 is filling queue 305, a connection can be made between CPU 103 and system memory 105 via queues 303 and 307 as shown in FIG. 5. When queue 305 is full, switcher 301 can be returned to the configuration of FIG. 4 to enable the data from queue 305 to pass into queue 307.

Figure 6:
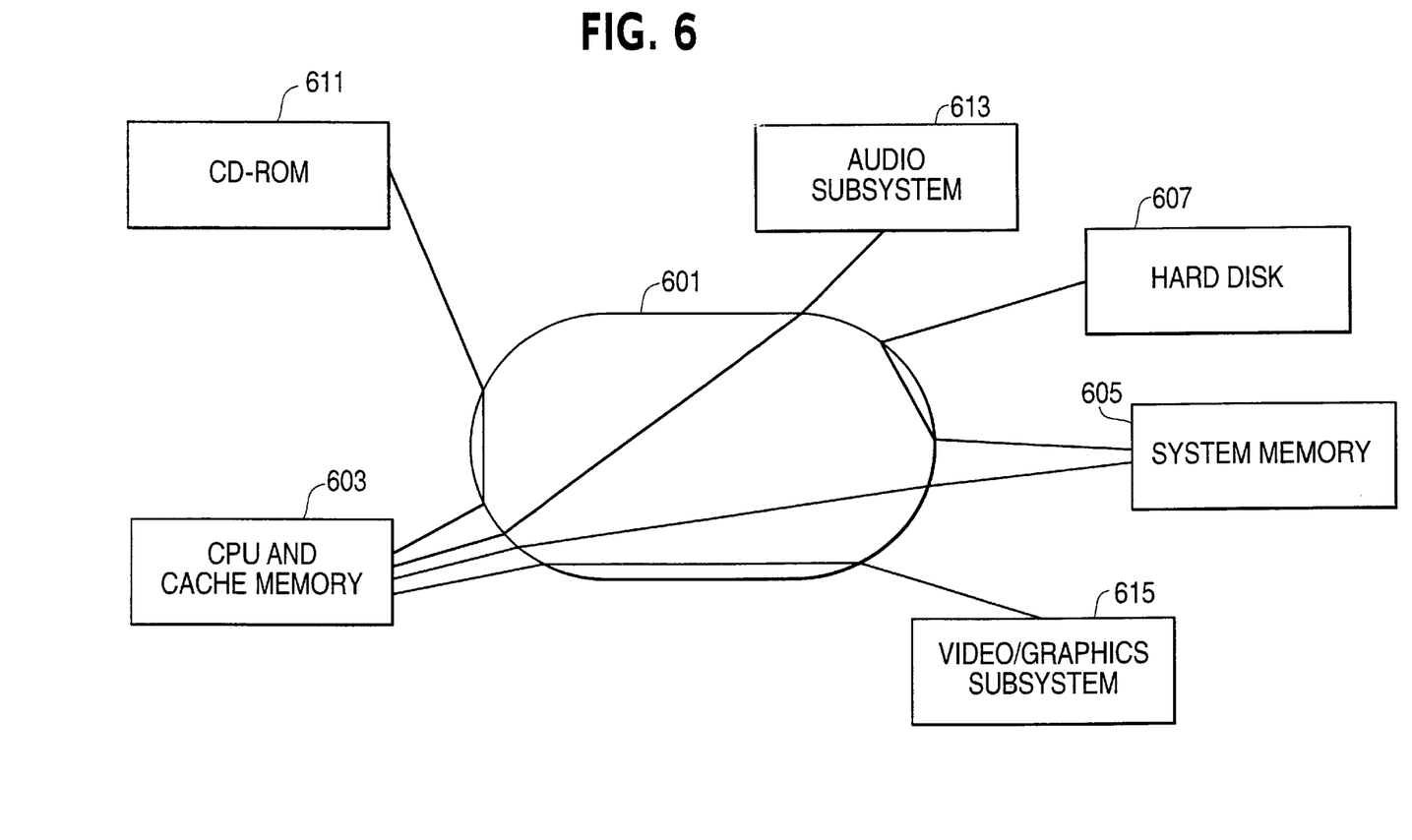
FIG. 6 shows multiple connections within a packet switch.

FIG. 6 shows multiple connections within a switcher 601. According to the invention, switcher 601 supports concurrent communication. For example, in order to process an MPEG audio/video data stream from CD-ROM 611, a CPU 603 receives the MPEG audio/video data stream through a connection made by switcher 601. The CPU 603 de-interleaves and decompresses the data stream into its respective audio and video portions. The audio portion is sent to an audio subsystem 613 and the video portion is sent to a video/graphics subsystem 615 through connections made by the switcher 601. FIG. 6 also shows connections made between a system memory 605 and the cpu 603 and between the system memory 605 and a hard disk 607. Such connections may provide communication paths, for example, for an application program accessing the MPEG data stream. According to the invention, two or more of the foregoing connections may be maintained concurrently by switcher 601 in order to provide more efficient communication.

Figure 7:
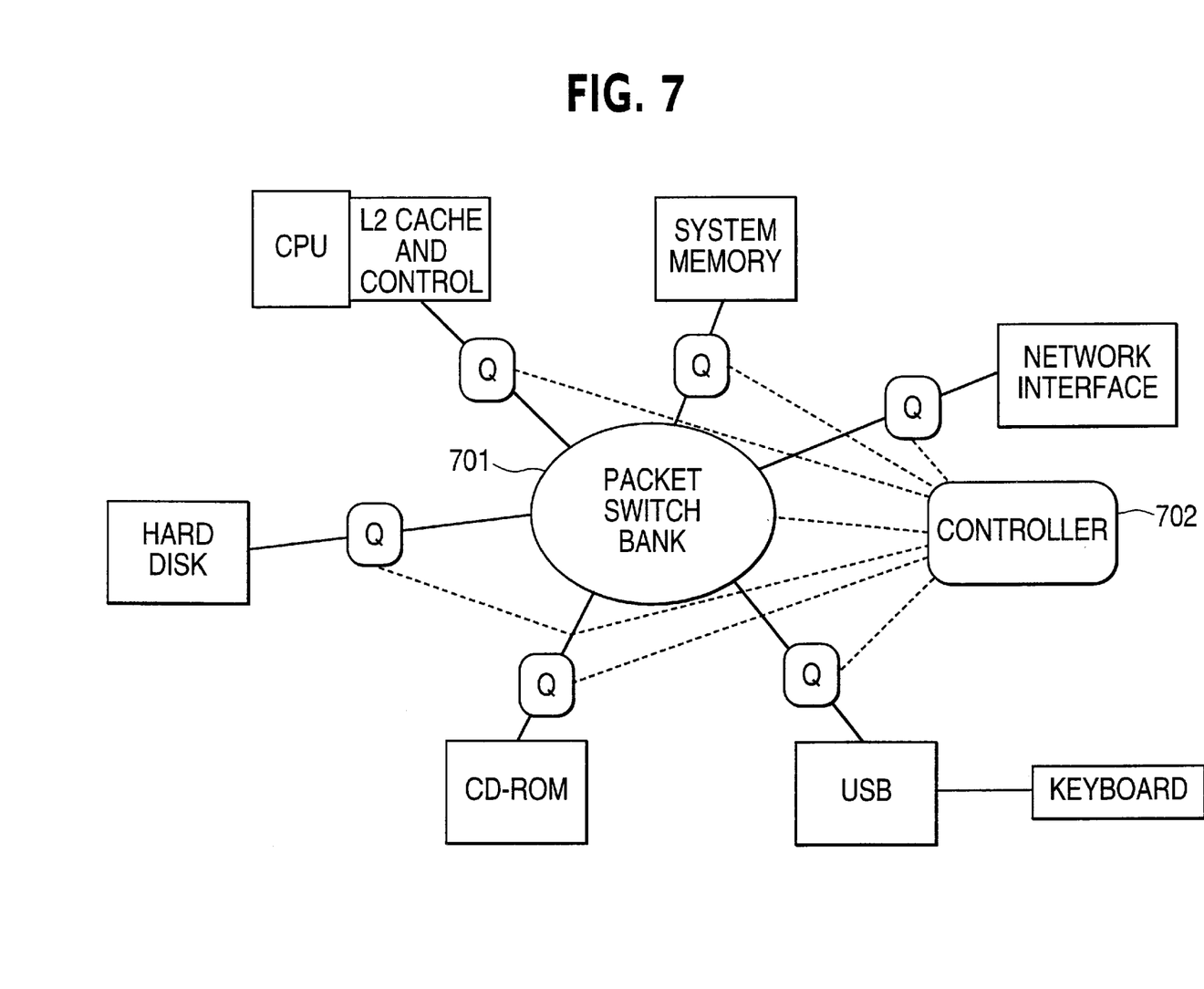
FIG. 7 shows a block diagram of a second embodiment according to the invention.

In an alternative embodiment of the invention shown in FIG. 1, a system controller, such as controller 702 shown in FIG. 7, is interconnected with packet switch bank 701 and the various components of the computer system through queues in order to control which packet switches of packet switch bank 701 are connected to which computer components. Alternatively, packet switch bank 101 can include its own controller that determines which packet switches of packet switch bank 701 are connected to which components of the computer system. In either case, controller 702 or a controller internal to packet switch bank 701 can further cause connections, such as those shown in FIGS. 4, 5, and 6, to be made at the appropriate times to optimize the data flow between each of the packet switches in packet switch bank 701.

According to the invention, when a queue is ready, the controller 702 requires no information about the nature of the peripheral (i.e. that the target peripheral is a hard disk) in order to service the queue. The controller 702 controls the queues solely on the basis of communication parameters such as data rate and periodicity. Moreover, the controller 702 monitors the queues and time switches the queues based on the communication parameters and the data traffic. Preferably, the queues are maintained close to saturation without overloading. An advantage, according to the invention, of the controller 702 is that the controller 702 maintains statistics on queue usage and can provide a signal that indicates a need to increase packet switch capacity.

As should be clear from the above description, additional packet switches can be incorporated into packet switch bank 701 to meet increasing demand on the system. Further, each device of the computer system can input and output data at a rate which is most appropriate for that device, and need not have the capability to output data at the highest data rate among the devices.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A computer architecture comprising:

a plurality of computer components;

a packet switch bank; and a plurality of packet interfaces, each packet interface connecting a corresponding one of the computer components to the packet switch bank, wherein the computer components communicate via the packet switch bank through the plurality of packet interfaces, wherein the packet switch bank comprises a plurality of packet switches and a packet switch controller connected to each of the plurality of packet switches, wherein the packet switch controller controls each packet switch to be coupled to specific ones of the computer components at respective predetermined times during a fixed time frame, wherein the packet switch bank further comprises a plurality of queues between the packet switches and the computer components, and wherein each queue is affiliated with a corresponding packet switch, such that the packet switch controller allocates queues affiliated with a given packet switch to interfaces between the given packet switch and the specific ones of the computer components coupled to the given packet switch.

2. A computer architecture comprising:

a plurality of computer components;

a packet switch bank; and a plurality of packet interfaces, each packet interface connecting a corresponding one of the computer components to the packet switch bank, wherein the computer components communicate via the packet switch bank through the plurality of packet interfaces, wherein the packet switch bank comprises a plurality of packet switches and a packet switch controller connected to each of the plurality of packet switches, wherein the packet switch controller controls each packet switch to be coupled to specific ones of the computer components at respective predetermined times during a fixed time frame, wherein the packet switch bank further comprises a plurality of queues between the packet switches and the computer components, and wherein each queue is affiliated with a corresponding computer component, such that the packet switch controller allocates queues affiliated with a given computer component to interfaces between the given computer component and specific packet switches coupled to the given computer component.

3. A method of communicating from a first component of a computer system to a second component of the computer system, comprising the steps of:

transmitting a packet from the first component to a packet switch bank;

selecting a packet switch from a plurality of packet switches in the packet switch bank to handle the packet;

configuring the selected packet switch to be coupled at an input side to the first component;

configuring the selected packet switch to be coupled at an output side to the second component; and transferring the packet through the selected packet switch to the second component, wherein the packet is transmitted from the first component to the packet switch bank at a first data rate and is transferred from the selected packet switch to the second component at a second data rate, wherein the first data rate is associated with the first component and the second data rate is associated with the second component, wherein the computer system includes a third component and a fourth component, wherein the selected packet switch is configured to be coupled at an input side to the third component and at an output side to the fourth component to thereby provide a communications path between the third and fourth components, and wherein the selected packet switch is capable of transferring a first packet between the first and second components at a same time the selected packet switch is transferring a second packet between the third and fourth components.

4. A computer architecture comprising:

a plurality of computer components;

a packet switch bank; and a plurality of packet interfaces, each packet interface connecting a corresponding one of the computer components to the packet switch bank, wherein the computer components communicate via the packet switch bank through the plurality of packet interfaces, wherein the packet switch bank comprises a plurality of packet switches and a packet switch controller connected to each of the plurality of packet switches, wherein the packet switch controller controls each packet switch to be coupled to specific ones of the computer components at respective predetermined times during a fixed time frame, wherein the packet switch bank further comprises a plurality of queues between the packet switches and the computer components, and wherein the packet switch controller is configured to be connected to a particular one of the queues and a predetermined destination computer component when the particular one of the queues is full, wherein the packet switch controller outputs data from the particular one of the queues to the predetermined destination computer component in at least one packet until the particular one of the queues is empty.

5. A computer architecture comprising:

a plurality of computer components;

a packet switch bank; and a plurality of packet interfaces, each packet interface connecting a corresponding one of the computer components to the packet switch bank, wherein the computer components communicate via the packet switch bank through the plurality of packet interfaces, wherein the packet switch bank comprises a plurality of packet switches and a packet switch controller connected to each of the plurality of packet switches, wherein the packet switch controller controls each packet switch to be coupled to specific ones of the computer components at respective predetermined times during a fixed time frame, wherein the packet switch bank further comprises a plurality of queues between the packet switches and the computer components, and wherein the packet switch controller is configured to monitor data stored in the queues that are connected to the packet switch, and wherein the packet switch controller is configured to dynamically chance a switching pattern between particular ones of the queues based on the monitored data stored in the queues over a period of time.

6. A computer architecture comprising:

a CPU;

a computer keyboard;

a system memory;

a packet switch bank coupled to the CPU, the computer keyboard and the system memory; and first through third packet interfaces, said first through third packet interfaces respectively connecting the CPU, the computer keyboard and the system memory to the packet switch bank, wherein the CPU, the computer keyboard and the system memory communicate with each other through the plurality of packet interfaces, wherein the packet switch bank is notified as to when any of the first through third packet interfaces are full with data, and wherein the packet switch interface connects the full one of the first through third packet interfaces with a predetermined destination interface for the full one of the first through third packet interfaces to empty the full one of the first through third packet interfaces.

7. A computer architecture comprising:

a CPU;

a computer keyboard;

a system memory;

a packet switch bank coupled to the CPU, the computer keyboard and the system memory;

first through third packet interfaces, said first through third packet interfaces respectively connecting the CPU, the computer keyboard and the system memory to the packet switch bank;

a CD-ROM for storing an audio/video data stream containing audio data and video data;

an audio subsystem for outputting sound based on an audio signal received by the audio subsystem; and a video/graphics subsystem for outputting at least one of video and graphics based on a video/graphics signal received by the video/graphics subsystem, wherein the CPU, the computer keyboard and the system memory communicate with each other through the plurality of packet interfaces, wherein the packet switch bank provides a first connection between the CPU and the CD-ROM for providing the audio/video data stream from the CD-ROM to the CPU, wherein the CPU processes the audio/video data stream and outputs the audio signal to the audio subsystem along a second connection and the video/graphics signal to the video/graphics subsystem along a third connection, and wherein the packet switch bank is capable of simultaneously transferring the audio signal from the CPU to the audio subsystem at a same time the packet switch bank is transferring the video/graphics signal to the video/graphics subsystem.

\* \* \* \* \*